(12) United States Patent
Guidash et al.

(10) Patent No.: US 6,323,476 B1
(45) Date of Patent: Nov. 27, 2001

(54) ACTIVE PIXEL SENSOR WITH SWITCHED SUPPLY ROW SELECT

(75) Inventors: Robert M. Guidash, Rush; Teh-Hsuang Lee, Webster, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/298,535

(22) Filed: Apr. 23, 1999

Related U.S. Application Data

(63) Continuation of application No. 08/806,360, filed on Feb. 27, 1997, now Pat. No. 5,949,061.
(60) Provisional application No. 60/018,136, filed on May 22, 1996.

(51) Int. Cl.[7] .............................. H04N 3/14; H01L 27/00
(52) U.S. Cl. ...................... 250/208.1; 257/291; 348/308
(58) Field of Search .............................. 250/208.1, 214.1; 257/291, 292, 443, 444; 348/308, 300, 301, 302

(56) References Cited

U.S. PATENT DOCUMENTS

| 5,144,447 | 9/1992 | Akimoto et al. | 358/213.11 |
| 5,631,704 | * 5/1997 | Dickinson et al. | 250/208.1 |

FOREIGN PATENT DOCUMENTS

| 0 719 048 A2 | 6/1996 | (EP) | H04N/7/18 |

OTHER PUBLICATIONS

Copy of European Search Report, dated May 31, 1999.

* cited by examiner

Primary Examiner—John R. Lee
Assistant Examiner—Kevin Pyo
(74) Attorney, Agent, or Firm—Peyton C. Watkins

(57) ABSTRACT

A pixel architecture for economizing area within the pixel leaving a greater proportion of area for photodetector area. Area is saved by employing a method of generating row select signals for active pixel sensors comprising the steps of providing an active pixel sensor having a plurality of pixels arranged in columns and rows and selecting rows within the active pixel sensor by application of a supply voltage to a transistor circuit within a predetermined row to be selected and removal of the supply voltage from the transistor circuits of unselected rows.

20 Claims, 4 Drawing Sheets

ACTIVE PIXEL SENSOR WITH SWITCHED SUPPLY ROW SELECT

CROSS-REFERENCE TO RELATED APPLICATIONS

Reference is made to and priority claimed from U.S. Provisional Application Ser. No. 60/018,136 filed May 22, 1996 entitled ACTIVE PIXEL SENSOR WITH SWITCHED SUPPLY ROW SELECT. This is a continuation of application Ser. No. 08/806,360 filed Feb. 27, 1997, and now U.S. Pat. No. 5,949,061.

FIELD OF INVENTION

This invention relates to the field of solid state photo-sensors, and more specifically to imagers referred to as active pixel sensors (APS).

BACKGROUND OF THE INVENTION

APS are solid state imagers where each pixel contains a photo-sensing means, reset means, charge to voltage conversion means, and all or part of an amplifier. APS devices have been operated in a manner where each line or row of the imager is selected and then read out using a column select signal (analogous to a word and bit line in memory devices respectively). The row select operation has been accomplished in prior art devices by incorporation of a row select transistor in each pixel that is turned on to make that row active (see FIG. 1). Since this transistor is placed in each pixel, its inclusion reduces the fill factor for the pixel because it takes up area that could otherwise be used for the photodetector, or charge storage region. This reduces the sensitivity and saturation signal of the sensor.

In order to build high resolution, small pixel APS devices, it is necessary to use sub-micron CMOS processes in order to minimize the area of the pixel allocated to the row select transistor and other parts of the amplifier in the pixel. In essence, it takes a more technologically advanced and more costly process to realize the same resolution and sensitivity APS device compared to a standard charge coupled device (CCD) sensor. However, APS devices have the advantages of single 5V supply operation, lower power consumption, x-y addressability, image windowing, and the ability to effectively integrate signal processing electronics on chip, when compared to CCD sensors.

One approach to providing an image sensor with the sensitivity of a CCD and the advantages of an APS device, is to improve the fill factor and sensitivity of an APS device. This present invention addresses these problems that exist within the prior art by simplifying the circuitry used in addressing the imager.

SUMMARY OF THE INVENTION

The present invention relates to the field of solid state photo-sensors and imagers, specifically imagers referred to as active pixel sensors (APS). It consists of a new method of row selection that eliminates the need for a separate row select transistor or gate per pixel, by eliminating the need for a separate row select buss in one case, and eliminating the need for a row select transistor in another case, while maintaining the ability to selectively address rows of the APS device. By employing a method of generating row select signals for active pixel sensors comprising the steps of: providing an active pixel sensor having a plurality of pixels arranged in columns and rows; and selecting rows within the active pixel sensor by application of a supply voltage to the supply of the in pixel amplifiers within a predetermined row to be selected and removal of the supply voltage from the supply of the in-pixel amplifiers of unselected rows.

A prior art APS pixel is shown in FIG. 1. The pixel comprises a photodetector (PDET), that can be either a photodiode (PD) or photogate (PG), transfer gate (TG), floating diffusion (FD), reset transistor (RES), with a reset gate (RG), row select transistor (ROWST), with a row select gate (RSG), and signal transistor (SIG) which has its gate connected to floating diffusion and operates as an amplifier for the photocharge stored on the floating diffusion. Pixels are arranged in an array (X-columns and Y-rows), to form an image sensor. Incident light creates electrons in the photo-detector. These electrons are transferred onto the floating diffusion which is connected to the gate of SIG. This signal is read out by selecting the desired row (turning on the desired ROWST) by application of an "on-voltage" to the gate of ROWST), and then selecting each column separately. All other rows are "turned-off" by applying the appropriate signal to the gate of ROWST for those rows. Hence when selecting a specific column (the details of this operation are not relevant to this invention), the signal present on that line will be determined by which row is selected (i.e. the row in which ROWST is turned on). A simplified schematic of a single column is provided in FIG. 2. The output voltage $V_o$, is determined by which row transistor is turned-on, since all other signal transistors are essentially disconnected.

This invention provides a means for reducing the components required for row selection. In the first architecture, the separate row select buss is eliminated. In the second architecture, row selection is accomplished without using a row select transistor per pixel. Two physical embodiments of the new pixel architectures are shown in FIGS. 3A and 3B. Other specific physical embodiments are realizable. These two are chosen for illustration.

In the first architecture (shown in FIG. 3a), the pixel comprises a PD, TG, FD, RES, RG, SIG, ROWST and row select signal line (ROWSIG). It does not contain a separate row select gate or buss (RSG). In this architecture, row selection is accomplished by applying the supply voltage VDD to the desired ROWSIG while applying OV to the remaining ROWSIG's. The SIG transistor 35 which has its gate connected to floating diffusion 26 operates as an amplifier for the photocharge stored on the floating diffusion 26. This effectively switches the supply side of the SIG 35 transistor amplifier from VDD to 0 volts. It will be understood by those skilled in the art that while the preferred embodiment of the present invention switches the supply side to the SIG 35 transistor amplifier by connecting ROWSIG to the drain of the SIG 35 transistor amplifier and applying differing potential substantially equal to VDD or 0 volts, that an equivalent result can be achieved by reversing the polarity. To reverse the polarity that switches the supply side of the SIG 35 transistor amplifier, the ROWSIG would then be connected to the source of the SIG 35 transistor amplifier and potentials voltages differing from essentially 0 volts to GROUND. A simplified schematic of one column is provided in FIG. 4. The output voltage is determined by which ROWSIG that VDD is applied to, similar to prior art except that only one buss per row is used to accomplish row select, ROWSIG, rather than 2 busses, VDD and RSG. The area that was previously used for RSG can now be used for the PD, thus improving the fill factor and sensitivity of the pixel.

The pixel in FIG. 3B comprises a PD, TG, FD, RES, RG SIG and row select signal line (ROWSIG). It does not contain a separate row select transistor or buss (ROWST and RSG). In this architecture, row selection is accomplished by applying the supply voltage VDD to the desired ROWSIG while floating the remaining ROWSIG's. A simplified schematic of one column is provided in FIG. 5. The output voltage is determined by which ROWSIG that VDD is applied to, similar to prior art except that only one row select switch per row is used rather than one per pixel. The area that was previously used for ROWST can be used for the PD, thus improving the fill factor and sensitivity of the pixel.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention provides an advantage in that it uses less semiconductor area for control circuitry allowing more area for photodetector, thereby improving the fill factor.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

This invention relates to the field of solid state photosensors and imagers, specifically imagers referred to as active pixel sensors (APS). It consists of a new method of row selection that eliminates the need for a separate row select transistor or gate per pixel.

Figure 1:
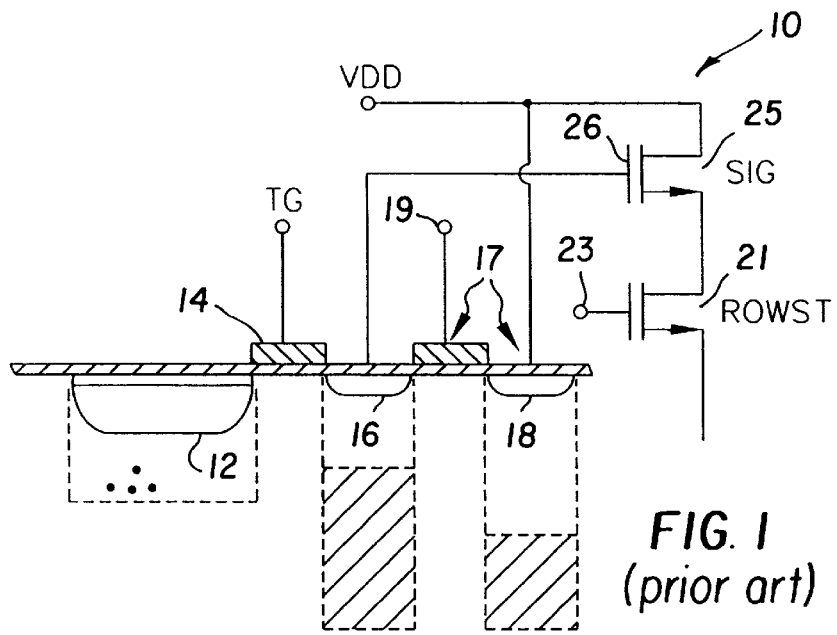
FIG. 1 is a diagram of a prior art pixel for an active pixel sensor.

A prior APS pixel is shown in FIG. 1. The pixel 10 comprises a photodetector 12, that can conventionally be either a photodiode or photogate, a transfer gate 14, floating diffusion 16, reset transistor 17, with a reset gate 19, adjacent to reset drain 18, row select transistor 21, with a row select gate 23, and signal transistor 25. In this case there are 3 transistors and 4 buss lines per pixel. Pixels are arranged in an array (X-columns and Y-rows), to form an image sensor. Electrons generated in the photodetector 12 are transferred onto the floating diffusion 16 which is connected to the gate 26 of signal transistor 25. This signal is read out by selecting the desired row (turning on the row select transistor 21 by application of an "on-voltage" to the row select gate 26), and then selecting each column. All other rows are "turned-off" by applying the appropriate signal to the row select gate 26 for those rows. Hence when selecting a specific column (the details of this operation are not relevant to this invention), the signal present on that line will be determined by which row select transistor 21 is turned on.

Figure 2:
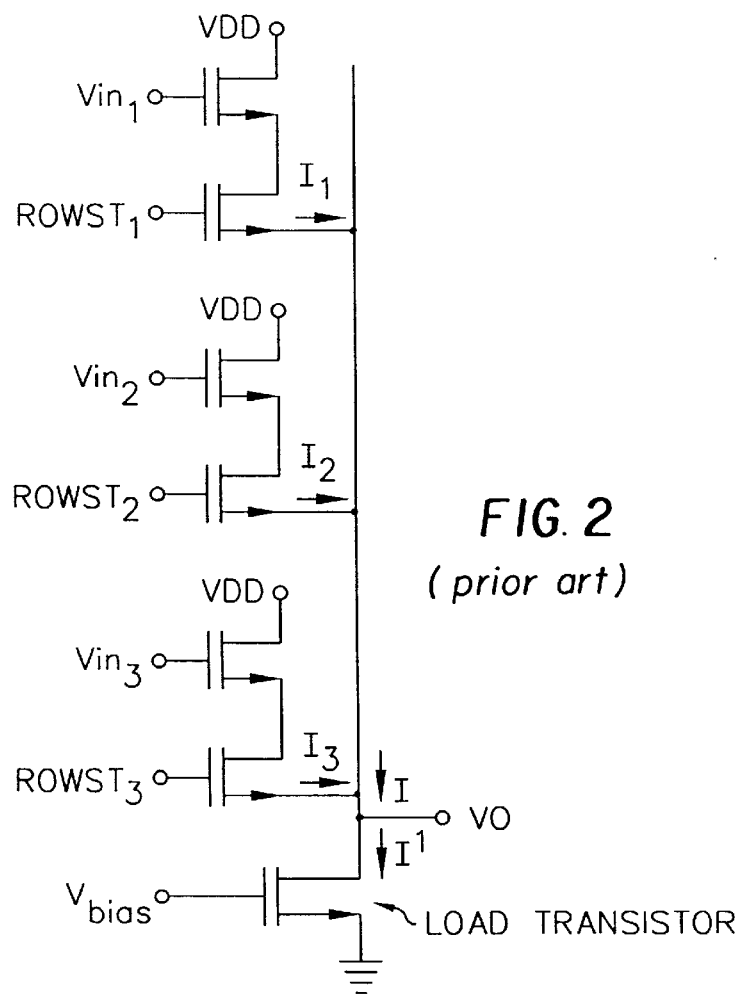
FIG. 2 is a simplified schematic of a single column of the active pixel sensor shown in FIG. 1.

A simplified schematic of a single column is provided in FIG. 2. The circuit configuration is a source follower with selectable signal transistors in parallel and one load transistor per column. In this circuit the output voltage is modulated in the following manner. From Kirchoff's Current Law, the current I must be equal to I'. I' is determined by the source to gate voltage ($V_{gs}$) of the load transistor. As $V_{in}$ changes, I will want to change since $V_{gs}$ of the signal transistor changes. In order for I to remain equal to I', $V_{gs}$ must remain constant, hence $V_s$ of the signal transistor, which is $V_o$, must change accordingly. With $ROWST_2$ turned on and all others turned off, the current I is simply $I_2$ since all other currents are zero because those paths to VDD are effectively open circuited by the respective ROWST's being turned off.

The present invention provides a means for selectively connecting the desired row to the output node, and disconnecting all others, without using a separate row select buss in the first case, and in the second case, without using a row select transistor per pixel. Physical embodiments of the new pixel architectures are shown in FIGS. 3A, 3B and 3C while other specific physical embodiments are realizable, those illustrated in FIGS. 3A and 3B represent preferred embodiments of the present invention.

Figure 3A:
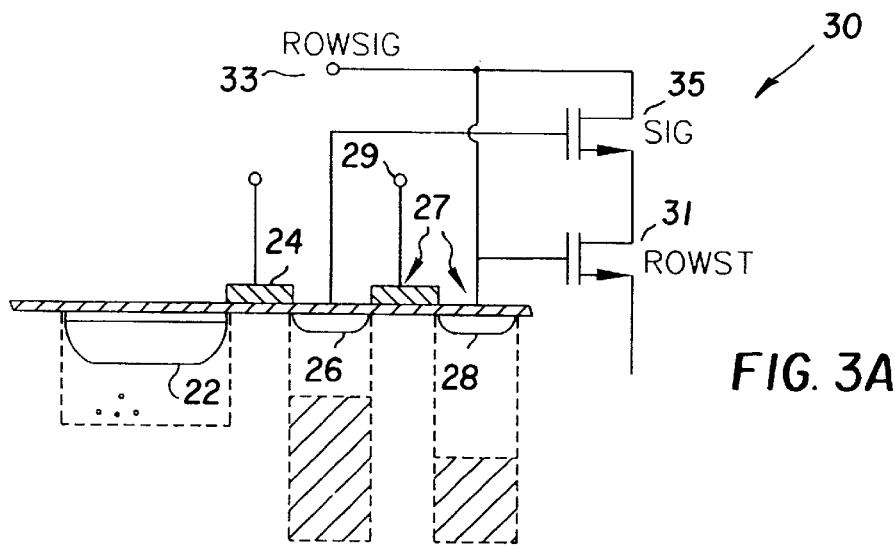
FIG. 3A is a diagram illustrating the active pixel sensor of the invention.

Referring to FIG. 3A, pixel 30 comprises a photodetector (PD) 22, transfer gate (TG) 24, floating diffusion (FD) 26, reset transistor (RS) 27 comprising reset gate (RG) 29 and reset drain (RD) 28, the row select transistor (ROWST) 31, signal transistor (SIG) 35 and row select signal line (ROWSIG) 33. It does not contain a separate row select buss as does the prior art device illustrated in FIG. 1. It requires only 3 buss lines per pixel, those for TG 24, RG 29, ROWSIG 33, as compared to 4 busses for the prior art pixel.

Figures 4, 5:
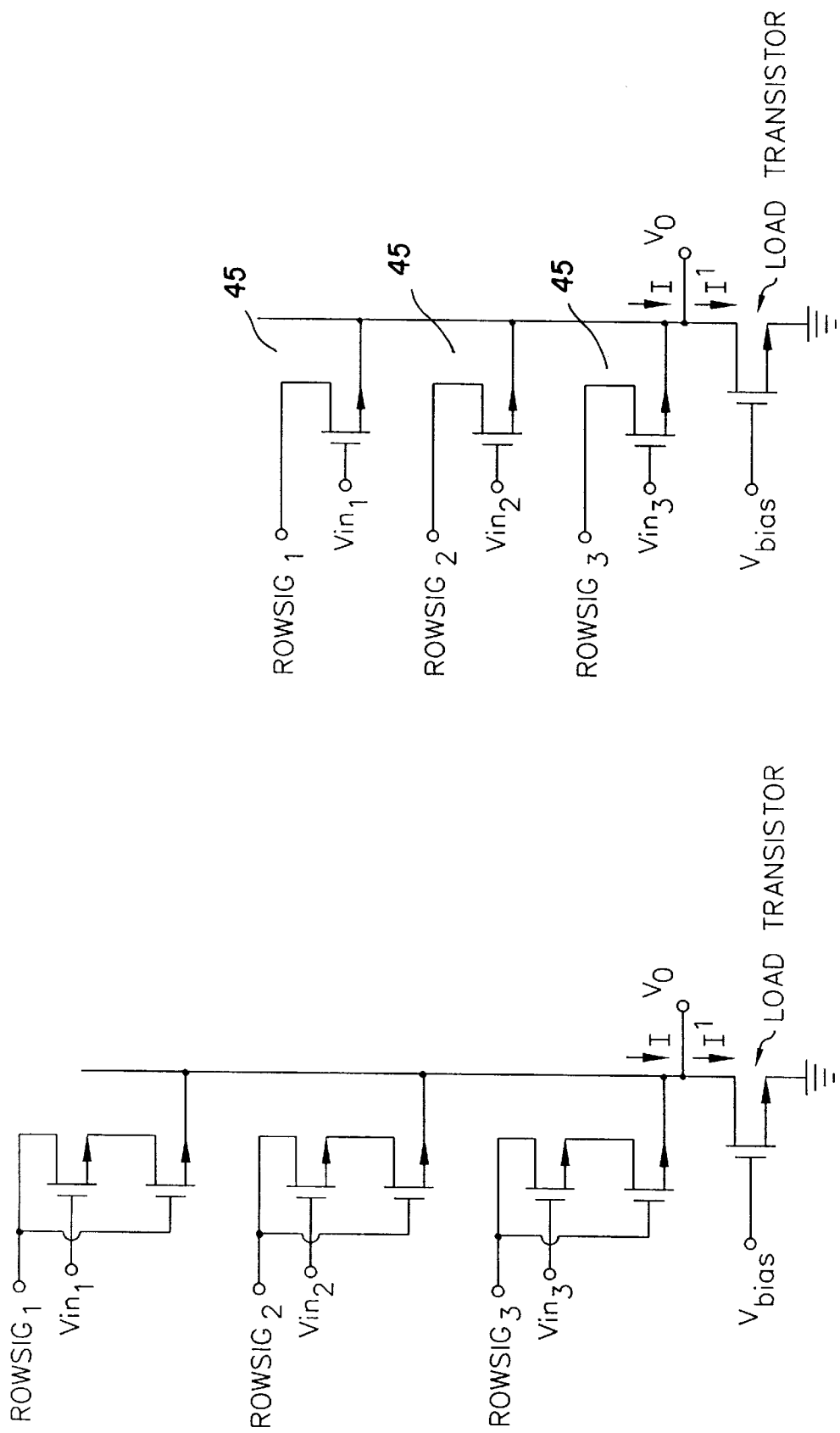
FIG. 4 is a simplified column schematic for FIG. 3A.
FIG. 5 is a simplified column schematic for FIG. 3B.

In the pixel architecture of the present invention, row selection is accomplished by applying the supply voltage VDD to the desired ROWSIG 33, and applying OV or the appropriate "off-signal", to the remaining ROWSIG's. A simplified schematic of one column is provided in FIG. 4. The circuit configuration is the same as in the prior art, hence the modulation of Vo occurs similarly, except that the selective connect and disconnect is done by switching the supply voltage VDD to the drain of the signal transistor and the gate of the row select transistor, rather than having a separate row select gate buss. With this new architecture there is only one buss per row used to accomplish row select, ROWSIG, rather than 2 busses, VDD and RSG. The area that was previously used for RSG can now be used for the PD, thus improving the fill factor and sensitivity of the pixel.

Figure 3B:
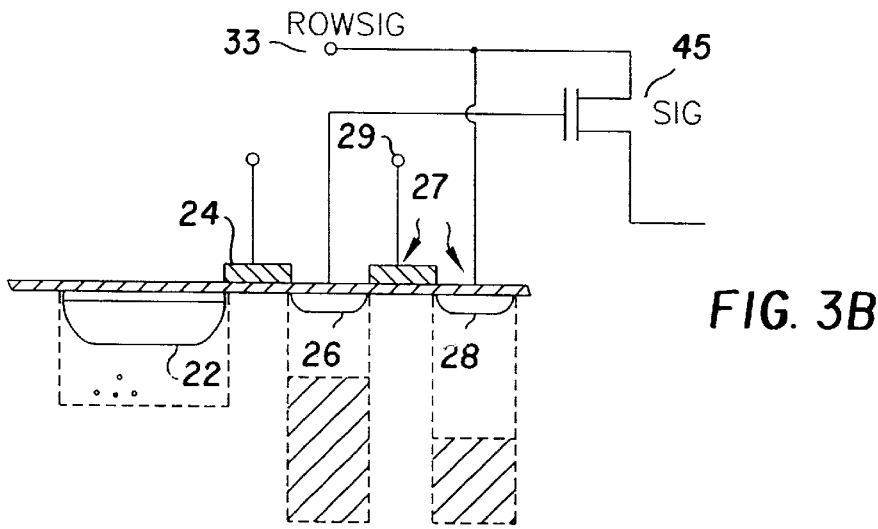
FIG. 3B is another architecture of the active pixel sensor of the present invention.
Figure 3C:
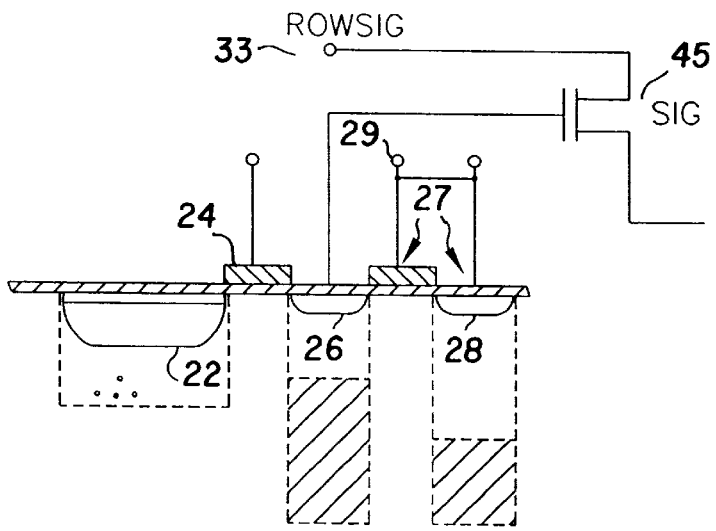
FIG. 3C is another architecture of the active pixel sensor of the present invention.

The pixel in FIG. 3B comprises a photodetector (PD) 22, transfer gate (TG) 24, floating diffusion (FD) 26, reset transistor 27 comprising reset gate 29 and reset drain 28, signal transistor (SIG) 45 and row select signal line (ROWSIG) 33. It does not contain a separate row select transistor (ROWST) 31 or row select bus (RSG) 23. It requires only 2 transistors and 3 buss lines per pixel.

In this architecture, row selection is accomplished by applying, or connecting, the supply voltage VDD to the desired ROWSIG 33 while floating, or disconnecting, the remaining ROWSIG's. A simplified schematic of one column is provided in FIG. 5. The circuit configuration is similar to prior art devices, hence the modulation of Vo occurs similarly, except that the selective connect and disconnect is done by switching the supply voltage VDD to the drain of the signal transistor 45, rather than by switching a separate transistor that is in series with each signal transistor 45. With this new architecture, the area that was previously used for ROWST 31 (for the embodiment shown in FIG. 3A) can now be used for the PD 22, thus improving the fill factor and sensitivity of the pixel. Also, the same fill factor could be maintained while reducing the size of the pixel and the APS device.

In addition to the improvement in fill factor or device size, the architecture of FIG. 3B provides an improvement in noise performance for three reasons. First, any noise that is present on the gate of the ROWST 21 in FIG. 1 will be highly capacitively coupled to the signal line (since this is the gate of a transistor), producing a noise component in the signal. Within the present invention the row select line is the VDD buss, and there is no other transistor gate coupled to the signal transistor 45. Secondly, the SIG 45 can now be enlarged to take up some of the space previously allocated to ROWST 31. This will reduce the 1/f noise of the signal transistor. Additionally, pattern noise due to non-uniform voltage drop across ROWST 31 is eliminated, since this transistor is no longer present.

Figure 6A:
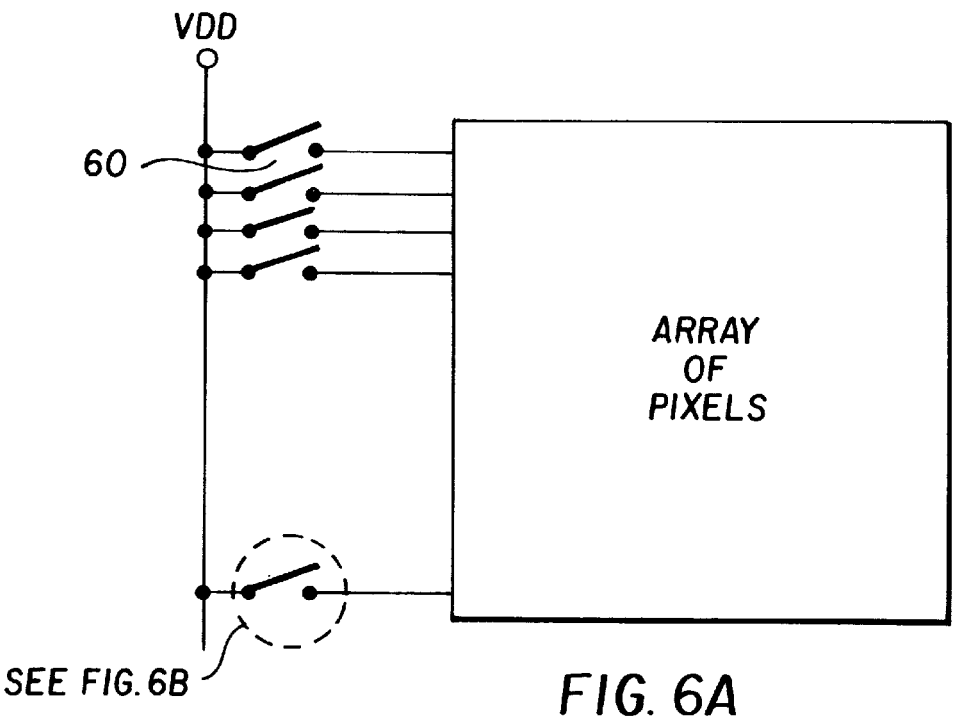
FIG. 6A is a diagram showing row select switches external to the array of pixels.
Figure 6B:
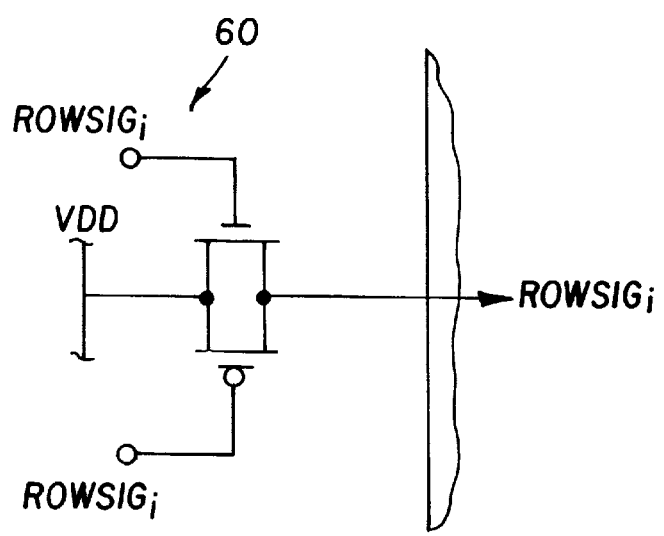
FIG. 6B is a CMOS transmission gate used as the row select switch.

FIG. 6A is a diagram showing row select switches 60 external to the array of pixels. FIG. 6B is a CMOS transmission gate used as the row select switch 60. One method of producing this switch is by use of a CMOS transmission gate as shown in FIGS. 6A and 6B. Since, as shown in FIG. 6A, there is only one of these row select switches 60 per row of the imager, and these are physically placed outside of the imaging array, its physical size is only limited in one dimension (i.e. it must be equal to or less than the pixel pitch), so it can be made large to reduce on-resistance without impacting fill factor of the pixel.

A variation of this architecture can be seen in FIG. 3C. In this case the reset drain and source follower drain are separated, so that the reset transistor supply voltage can be controlled separately from the source follower supply voltage to effect antiblooming control. The fill factor of this pixel architecture is improved by combining the reset gate signal and reset supply bus. This approach can also be utilized with the pixel architecture shown in FIG. 3A.

The invention has been described with reference to a preferred embodiment. However, it will be appreciated that variations and modifications can be effected by a person of ordinary skill in the art without departing from the scope of the invention. Accordingly, the invention can be practiced using various photodetecting elements such as a partially pinned photodiode, a fully pinned photodiode or a photogate.

PARTS LIST 10 pixel
12 photodetector
14 transfer gate
16 floating diffusion
17 reset transistor
18 reset drain
19 reset gate
21 row select transistor
22 photodetector
23 row select gate
24 transfer gate
25 signal transistor
26 floating diffusion
27 reset transistor
28 reset drain
29 reset gate
30 pixel
31 row select transistor
33 row select signal
35 signal transistor
45 signal transistor
60 row select switch

What is claimed is:

1. A method of generating select signals for active pixel sensors comprising the steps of:
    providing an active pixel sensor having a plurality of pixels with the pixels being arranged in addressable subsets;
    wherein each pixel comprises a transistor amplifier and wherein each transistor amplifier has a supply node, an input node, and an output node; and
    selecting a subset of pixels within the active pixel sensor by application of a select signal to the supply node of the amplifiers within the subset.

2. The method of claim 1 wherein the step of providing further comprises providing a subset selection transistor for each pixel such that the select signal is connected to the gate of the subset selection transistor.

3. The method of claim 2 further comprising the step of applying a non-select signal to the unselected subsets.

4. The method of claim 1 wherein the step of selecting further comprises applying a select signal to the subset to be selected and open circuiting the amplifier supply nodes to unselected subsets.

5. The method of claim 1 wherein the step of selecting further comprises applying a non-select signal to the amplifier supply node of the amplifiers within unselected subsets.

6. The method of claim 1 wherein the step of selecting further comprises employing a select switch to apply the supply voltage to the amplifier supply nodes.

7. The method of claim 1 wherein the step of providing further comprises providing each pixel with a photodetector operatively coupled to the input node of the amplifier of that pixel.

8. The method of claim 1 wherein the step of providing further comprises providing the select signal connected to a reset drain within each pixel.

9. A method of generating select signals for active pixel sensors comprising the steps of:
    providing an active pixel sensor having a plurality of pixels, the pixels being arranged in addressable subsets and each pixel having a transistor amplifier that has a supply node, an input node and an output node; and
    selecting subsets within the active pixel sensor by application of a select signal to the supply node of the amplifiers in each subset.

10. An active pixel sensor comprising:
    at least one pixel having a photodetector;
    a transistor amplifier having a supply node, an input node, and an output node with the input node operatively connected to the photodetector; and
    a selection circuit comprising a selection signal buss being coupled to the supply node of the transistor amplifier.

11. The invention of claim 10 further comprising:
    a selection transistor; and
    a selection buss that has an electrical connection to each of the supply node of the transistor amplifier and a gate on the selection transistor.

12. The sensor of claim 10 wherein the selection circuit is operative to select a group of pixels.

13. The sensor of claim 12 wherein the sensor has a plurality of pixels arranged in rows and the selection circuit is operative to select a row of pixels.

14. The sensor of claim 10 wherein the pixel further comprises a reset transistor with a drain having an electrical connection to the selection signal.

15. The sensor of claim 10 wherein the pixel further comprises a reset transistor with a drain that does not have an electrical connection to the selection signal.

16. The sensor of claim 15 the reset transistor has a gate to that is electrically connected to a drain of the reset transistor.

17. The active pixel sensor of claim 10 wherein the pixel further comprises a reset transistor, the reset transistor has a gate that is electrically connected to a drain of the reset transistor.

18. An active pixel sensor comprising:

at least one pixel wherein the pixel has a transistor amplifier operatively connected to the pixel, the transistor amplifier having a supply node, an input node and an output node;

a selection circuit comprising a selection signal that is directly electrically connected to the supply node of the transistor amplifier; and a selection buss that contains the selection signal.

19. The active pixel sensor of claim 18 wherein the pixel further comprises a reset transistor, the reset transistor has a gate that is electrically connected to a drain of the reset transistor.

20. An active pixel sensor comprising:

at least one pixel having a photodetector and a transistor amplifier operatively connected to the photodetector where the transistor amplifier further comprises a supply node, an input node and an output node;

a selection circuit comprising a selection transistor; and a reset transistor having a reset drain directly electrically connected to a reset gate.

* * * * *